United States Patent

Trzmiel

[11] Patent Number: 5,802,849
[45] Date of Patent: Sep. 8, 1998

[54] ACTUATING DEVICE FOR COUPLING OF AN AUTOMATIC TRANSMISSION OF A VEHICLE

[75] Inventor: Alfred Trzmiel, Grafenberg, Germany

[73] Assignee: Hydraulik-Ring Antriebs—und Steuerungstechnik GmbH, Nürtingen, Germany

[21] Appl. No.: 785,907

[22] Filed: Jan. 21, 1997

[30] Foreign Application Priority Data

Jan. 19, 1996 [DE] Germany .................. 196 01 758.0

[51] Int. Cl.⁶ .................. F04B 17/04; F16D 31/02
[52] U.S. Cl. .................. 60/477; 417/416; 417/470; 417/570
[58] Field of Search .................. 417/322, 413.2, 417/415, 416, 361, 570, 470; 60/477

[56] References Cited

U.S. PATENT DOCUMENTS

| | | | |
|---|---|---|---|
| 4,137,020 | 1/1979 | Ito et al. .................. | 417/470 |
| 4,492,106 | 1/1985 | Amighini .................. | 60/477 |
| 4,995,790 | 2/1991 | Schill et al. .................. | 417/361 |
| 5,409,356 | 4/1995 | Massie .................. | 417/416 |

FOREIGN PATENT DOCUMENTS 498920  11/1954  Italy .................. 417/416

*Primary Examiner*—Charles G. Freay
*Attorney, Agent, or Firm*—Robert W. Becker & Associates

[57] ABSTRACT

An actuating device for a coupling of an automatic transmission of a vehicle includes a housing and at least one piston slide positioned in the housing for pumping a pressure medium to a coupling element. At least one piezo element is positioned in the housing and acts on the at least one piston slide for displacing the piston slide from a neutral position in a reciprocating displacement direction within the housing.

22 Claims, 4 Drawing Sheets

ACTUATING DEVICE FOR COUPLING OF AN AUTOMATIC TRANSMISSION OF A VEHICLE

BACKGROUND OF THE INVENTION

The present invention relates to an actuating device for a coupling of an automatic transmission of a vehicle comprising at least one pump element with which medium is conveyed to a coupling element.

For automatic transmission controls an actuating device is necessary in order to provide for a coupling separation when the vehicle is parked. As an actuating device an electric motor with hydraulic pump is provided. Such an actuation device is connected with a switching element, in the form of a valve, to the coupling cylinder. This actuation device is complicated and expensive with regard to manufacture and mounting and requires a considerable mounting space.

It is therefore an object of the present invention to provide an actuating device of the aforementioned kind which is inexpensive to manufacture and which requires only a minimal mounting space.

SUMMARY OF THE INVENTION

The actuating device for a coupling of an automatic transmission of a vehicle according to the present invention is primarily characterized by:

A housing;

At least one piston slide positioned in the housing for pumping a pressure medium to a coupling element;

At least one piezo element positioned in the housing and acting on the at least one piston slide for displacing the piston slide from a neutral position in a reciprocating displacement direction within the housing.

The actuating device preferably further comprises a transmission member connected between the piezo element and the piston slide.

Advantageously, the transmission member is a pivot lever.

Preferably, the transmission member comprises a first and a second arm extending parallel to one another. The piezo element has an end face facing the transmission member and the piston slide has an end face facing the transmission member. The first arm rests at the end face of the piezo element and the second arm rests at the end face of the piston slide.

The pivot lever has a stay connecting the first and second arms and the pivot lever has a pivot axis located at the stay.

Preferably, the pivot axis extends at a right angle to the reciprocating displacement direction of the piston slide.

The piezo element and the piston slide are preferably parallel to one another.

The actuating device may further comprise a biasing element acting on the piston slide so as to force the piston slide in a biasing direction toward the transmission member.

The housing comprises at least one inlet for the pressure medium wherein the piston slide pumps the pressure medium from the at least one inlet.

The actuating device may further comprise a first check valve for closing the at least one inlet.

The housing may have a receiving chamber into which the inlet opens. The first check valve is a radially elastically deformable sleeve positioned in the receiving chamber. The first check valve opens the inlet by suction, created by the piston slide when displaced by the piezo element from the neutral position in the biasing direction, in order to flow of the pressure medium from the inlet into the receiving chamber.

The actuating device may further comprise a second check valve, wherein the housing has a flow connection for connecting the receiving chamber to the coupling element and wherein the second check valve is positioned in the flow connection for closing the flow connection.

The second check valve may open the flow connection with a pressure created by the piston slide when displaced by the piezo element from the neutral position in a direction toward the flow connection.

The actuating device may further comprise a control cylinder having a cylinder chamber, wherein the pressure medium flows through the second check valve into the cylinder chamber.

The control cylinder comprises a control piston and the control piston delimits the cylinder chamber and is connected to the coupling element.

The piezo element and the piston slide are components of a ready-to-mount module.

The ready-to-mount module is at least partially integrated into the control cylinder.

The ready-to-mount module may include the housing.

The actuating device may further comprise an actuating electronic member positioned within the housing for activating the piezo element.

The housing may comprise an electrical connector.

The housing may comprise a mounting flange.

Preferably, the actuating device further comprises an actuating electronic member positioned within the housing for activating the piezo element, wherein the electronic member and the piezo element are positioned at opposite ends of the piston slide within the housing.

In the inventive actuating device the pump element is formed by the piston slide which is actuated by the piezo element. The piezo element and the piston slide are constructively simple components which are also inexpensive to manufacture. They require only a minimal mounting space so that the inventive actuating device can also be used where only minimal mounting space is available. Since the piezo element operates at high frequencies, the piston slide can be reciprocated at high frequency. Thus, it is possible to produce within a short amount of time the required volume or required pressure for displacement of the coupling element. With the inventive actuating device it is thus possible, even when the motor of the vehicle is turned off, to perform the coupling separation in a simple manner. For example, it is possible to excite the piezo element via the closing cylinder of a door contact and to actuate in this manner the piston slide in order to perform the coupling separation. When using a travel return and a defined leakage in form of a throttle, it is possible to activate the coupling (clutch) of an automated gear box with the actuating device while driving.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
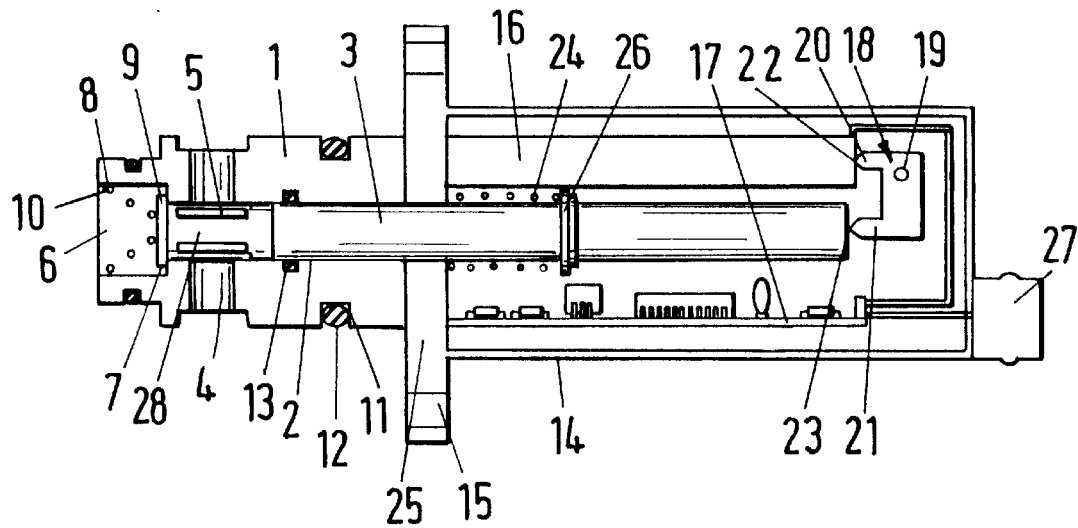
FIG. 1 shows in a schematic representation in longitudinal section the inventive actuating device.

The present invention will now be described in detail with the aid of several specific embodiments utilizing FIGS. 1 through 6.

The inventive actuating device comprises a housing 1 with a central bore 2. In the central bore 2 a piston slide 3 is displaceably arranged. An inlet 4 opens radially into the bore 2 for supplying a pressure medium, preferably a hydraulic medium. The inlet 4 is closable relative to the bore 2 with a check valve 5. In the shown embodiment, the check valve 5 is a sleeve and comprised of a flexible hose portion, that, according to FIG. 2, in the closing position rests with its circumference sealingly at the inner wall of the bore 2 to close the inlet 4 relative to the bore 2. The check valve 5 can also have any other suitable embodiment with which a high frequency check valve function can be fulfilled.

The axial (central) bore 2 opens into a recess 6 at the end face of the housing 1. The bore 2 opens into the bottom 7 of the recess 6. The recess 6 has positioned therein a pressure spring 8 of a further check valve 9.

The check valve 9 has a plate-shaped closure part which, under the force of the pressure spring 8, rests sealingly at the bottom 7 of the recess 6 and closes the bore 2 relative to the recess 6. The pressure spring 8 is secured within the recess 6 by an abutment 10 that is preferably made by stamping or bending.

The housing 1 is provided at its exterior with a circumferential recess 11 for receiving a ring seal 12. The actuating device is to be inserted with its housing 1 into the mounting space of a non-represented apparatus whereby the ring seal 12 rests sealingly at the inner wall of the mounting space. The inlet 4 is connected to a feed line of the apparatus, while the recess 6 in the mounted position is connected to the supply chamber of the apparatus.

At least one ring seal 13 for sealing the piston 3 is inserted into the inner wall of the bore 2. The piston slide 3 extends into the housing portion 14 provided with a flange 15. The actuating device is inserted into the mounting space of the apparatus such that the flange 15 which projects radially past the housing 1 and its housing portion 14 comes to rest at a limiting wall of the apparatus.

The housing part 14 encloses at least one actuating element 16 which is in the form of at least one piezo element. The piezo element 16 has an elongate structure and is connected to an actuating electronic member 17 which is arranged in the housing part 14. The piezo element 16 is positioned parallel to the piston slide 3 which extends into the housing part 14. The movement of the piezo element 16 is transmitted with the transmission member 18 onto the piston slide 3. The transmission member 18 is in the form of a pivot lever which is pivotable about an axis 19 extending perpendicular to the piezo element 16 and the piston 3. The lever 18 has two parallel arms 20 and 21 which extend perpendicular to the pivot axis 19 and abut the end faces 22 and 23 of the piezo element 16 and the piston slide 3, respectively. By pivoting the pivot lever 18 about the axis 19, the piston slide 3 is displaced in a corresponding direction.

The piston slide 3 may be loaded in the direction toward the lever 18 by at least one pressure spring 24 which rests with one end at the end face 25 of the housing part 14 positioned at the level of the flange 15 and with its other end at a collar 26 of the piston slide 3. When the pivot lever 18 is rotated clockwise about the axis 19 (FIG. 3), the piston slide 3 is displaced by the arm 21 of the pivot lever 18 counter to the force of the pressure spring 24. The piston slide 3 is always forced by the pressure exerted by the pressure spring 24 into abutment at the arm 21 of the pivot lever 18. When the piezo element 16 is in its neutral position, i.e., is not excited, the pivot lever 18 is returned counter clockwise about the axis 19 by the force of the pressure spring 24.

The arms 20, 21 of the pivot lever 18 have a blade or knife-shaped design (i.e., a triangular tip, see FIGS. 1–3) so that the pivot action of the pivot lever 18 does not impede the displacement of the piston slide 3. At the exterior of the housing part 14, an electrical connector 27 is provided with which the components of the actuating electronic member 17 can be supplied with current. The actuating electronic member 17 comprises a voltage amplifier as well as an electronic control device.

Figure 2:
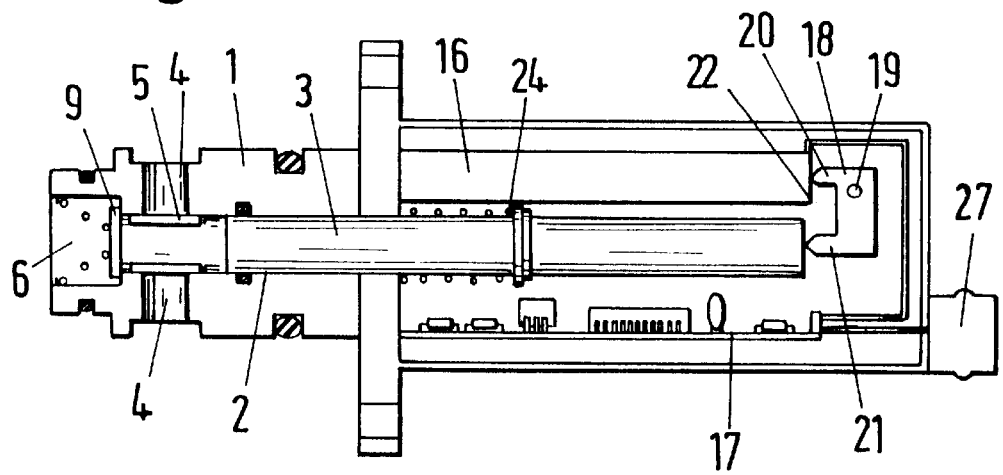
FIG. 2 shows in a representation corresponding to FIG. 1 a specific working position of the actuating device of FIG. 1.

In the neutral position according to FIG. 2, the piezo element 16 is not excited so that the piston slide 3 is in its retracted position. The piston slide 3 is forced by the force of the pressure spring 24 against the arm 21 of the transmission member 18 which with its other arm 20 rests at the end face 22 of the piezo element 16. The two check valves 5 and 9 are closed so that the central bore 2 receiving the piston slide 3 is separated from the radial inlet 4 and the recess 6.

When in the neutral position of the piston slide 3 according to FIG. 2 the piezo element 16 is excited so that it is shortened (contacts), the transmission member 18 is pivoted counter clockwise about the axis 19. The piston slide 3 is thus displaced by the force of the pressure spring 24 to the right in the drawings. Thus, within the receiving chamber 28 in front of the piston slide 3 a vacuum results so that the check valve 5 is opened. The check valve 9 remains in its closed position. Via the inlet 4, the pressure medium is thus sucked (pumped) into the receiving chamber 28 by the piston slide 3.

When the piezo element 16 is excited such that it increases in length, (expands) the transmission member 18 is pivoted from the position represented in FIG. 1 within a very short amount of time about the axis 19 in a clockwise direction. Thus, the piston slide 3 is displaced to the left (FIG. 3) counter to the force of the pressure spring 24 so that the pressure medium in the chamber 28 is pressurized. The check valve 5 is closed due to the resulting pressure so that the bore 2 is separated from the radial inlet 4. As soon as the pressure within the receiving chamber 28 is greater than the force of the pressure spring 8 acting on the check valve 9 and the system pressure acting within the recess 6, the check valve 9 is opened so that the pressurized medium can flow through the recess 6 to the supply chamber of the consuming device.

With the disclosed lengthwise contraction and expansion of the piezo element 16, the piston slide 3 is reciprocated in the aforedescribed manner within the bore 2. When the piezo element 16 expands, the piston slide 3 moves in the direction toward the recess 6 so that the pressure medium is pressurized within the receiving chamber 28. As soon as the pressure of the pressure medium is greater than the force of the pressure spring 8 acting on the check valve 9, the check valve 9 will open. The pressure medium is then displaced by the piston slide 3 in the aforementioned manner into the supply chamber and the pressure within the supply chamber is thus increased. When the piezo element 16 contracts the piston slide 3 is returned in the aforedescribed manner so that the pressure medium can be pumped into the receiving chamber 28 via the inlet 4.

The piezo element 16, depending on its operating frequency, can perform the contractions and expansions at a rate of multiple thousands per seconds, respectively, can perform an exactly preset number of strokes. Accordingly, with a theoretically incompressible medium, a defined volume stream can be adjusted, respectively, a defined pressure can be produced within the apparatus.

The piezo element 16, depending on the desired stroke volume, can also act without the transmission member 18 directly on the piston slide 3. In this case, the piezo element 16 is advantageously arranged axially behind the piston slide 3 so that upon expansion or contraction of the piezo element 16 it directly displaces the piston slide 3. A system positioned downstream of the actuating device can, for example, be operated by the control circuit and within a millisecond range produce a certain pressure to thus displace the piston counter to a spring force into a certain position.

Figure 3:
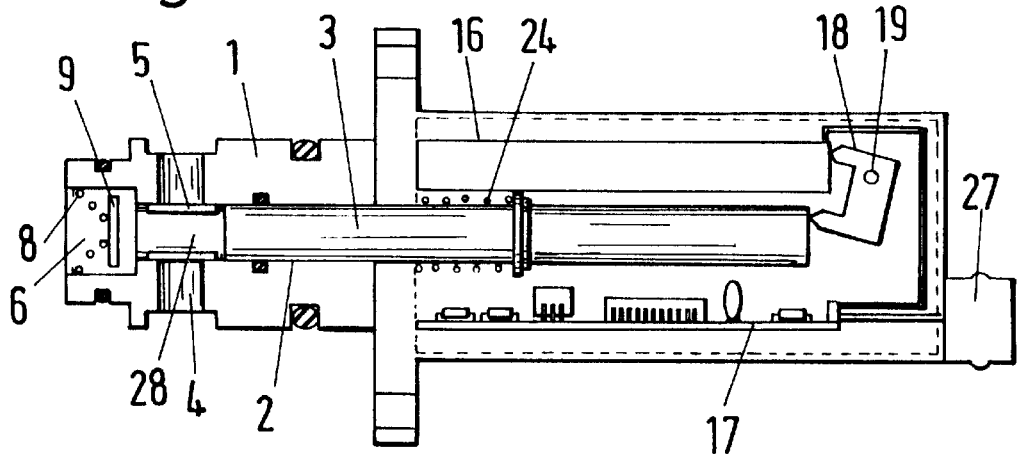
FIG. 3 shows in a representation corresponding to FIG. 1 another working position of the actuating device of FIG. 1.
Figure 4:
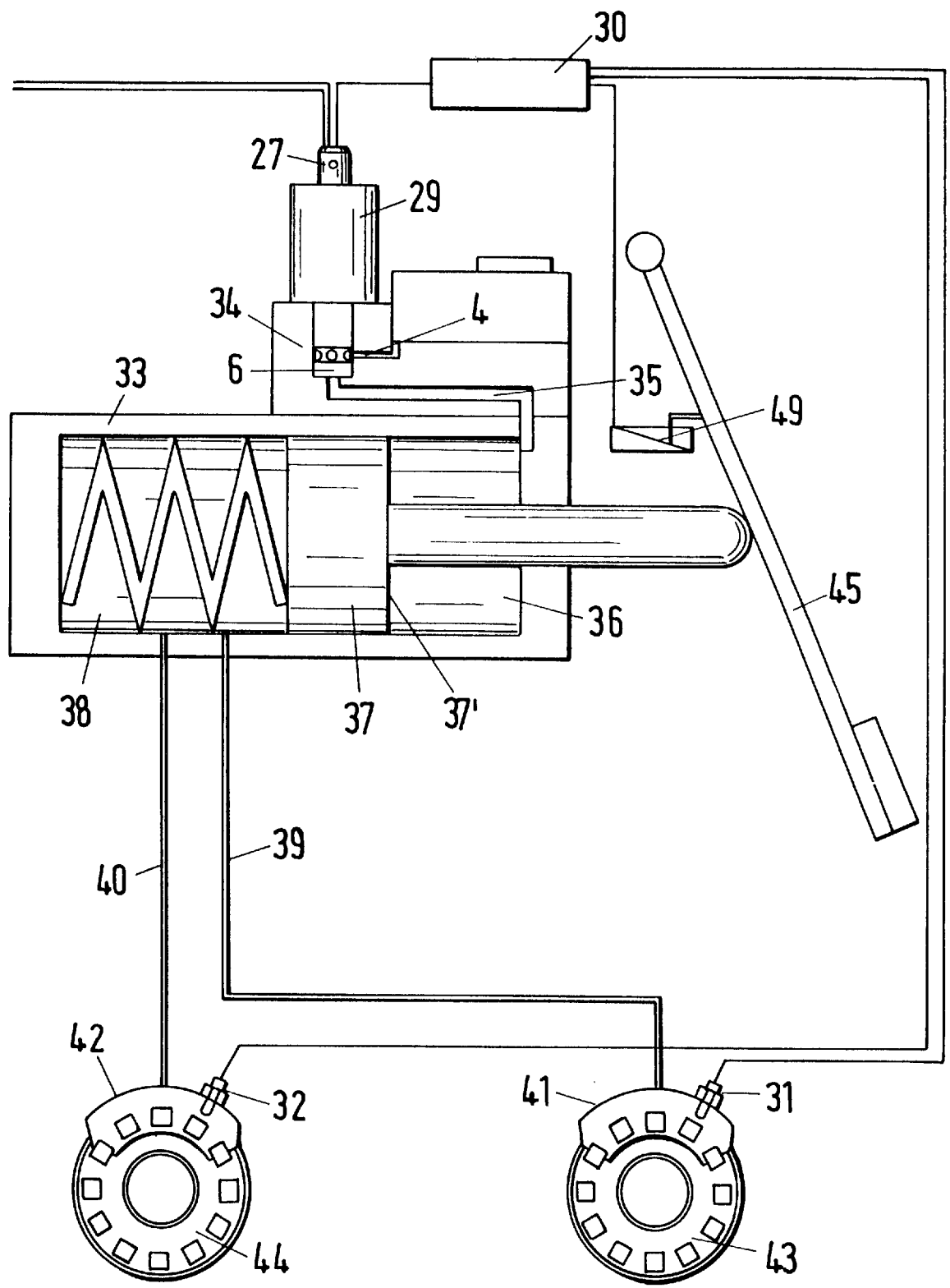
FIG. 4 shows schematically the integration of the inventive actuating device into an anti-lock braking system.

With the aid of FIG. 4 a particular application of the inventive actuation device according to FIGS. 1 to 3 will be explained in more detail. The actuating device, which is essentially a piezo pump, in the embodiment according to FIG. 4 is employed as a power brake. An anti-lock brake system comprises an electronic control device (circuit) 30 which is connected to the electrical connector 27 of the actuating device 29. To the control circuit 30 wheel sensors 31 and 32 are connected in a manner known per se. With the sensors the rotational velocity of the wheels is monitored and controlled. The actuation device 29 is directly connected to the main braking cylinder 33. The main braking cylinder 33 is only schematically represented in FIG. 4. The inlet 4 of the actuating device 29 is connected to the brake fluid container 34. The recess 6 of the actuating device 29 is connected with a brake line 35 via which the brake fluid can be pumped into the cylinder chamber 36 of the main braking cylinder 33. A piston 37 of the main braking cylinder 33 separates the cylinder chamber 36 from a further cylinder chamber 38 into which the brake lines 39 and 40 open. These brake lines 39, 40 are connected to the brakes 41 and 42 that cooperate with the brake disks 43, 44 of the respective wheel of a vehicle in a manner known per se. The piston 37 is activated with the brake pedal 45. Upon pressing down the brake pedal 45, the piston 37 is displaced counter to a counter force in a manner known per se. Furthermore, by suppressing the brake pedal 45 a brake potentiometer 49 is activated within the control circuit 30. Via the control circuit 30 the actuating device 29 is controlled such that in the aforedescribed manner pressure is released via the recess 6. Via the brake line 35 the brake fluid which is pressurized is introduced into the cylinder chamber 36 and acts on the piston ring surface 37'. This action provides, upon displacement of the piston 37, the required braking pressure in the brake lines 39, 40. The current supply of the actuating device 29 is connected to the connector 27 of the actuating device 29.

The function of the anti-lock braking system is known and will therefore only be discussed very briefly. In a controlled full braking action of a vehicle with an anti-lock braking system, the braking pressure is automatically adjusted for a constant brake pedal force such that the wheels of the vehicle will not lock. Sensors 30, 32 measure the respective rotational velocity of the brake disks 43, 44 and thus of the wheels of the vehicle. When the sensors 31, 32 signal a deceleration of the wheel that is too great, the braking pressure is then not further increased for the corresponding wheel; instead, the pressure is maintained at the currently present value. When the rotational movement is further reduced, the pressure within the main braking cylinder chamber 36 is lowered and the wheel is decelerated to a lesser degree. The pressure reduction within the main braking cylinder chamber 36 is achieved by the piezo element 16 of the actuating device 29 reducing its stroke frequency. If this is not sufficient, the piezo element 16 can also be turned off. The brake fluid in the cylinder chamber 36 and in the line 35 can flow back via at least one throttle provided at the check valve 9 into the inlet 4. The throttle is preferably a notch provided in the support surface of the plate of the check valve 9. Thus the rotational velocity of the wheel will be further reduced. The sensors 31, 32 will send corresponding signals to the control circuit 30. Upon reaching a certain limit value for the rotational velocity of the wheel, the control circuit 30 recognizes that the wheel is decelerated insufficiently. Thus, the braking pressure will be increased again so that the rotational movement of the wheel will be decreased.

In the embodiment according to FIG. 4 two wheels are connected to the common main braking cylinder 33 so that the two wheels of the vehicle are monitored and controlled together with respect to their rotational velocity. Since the piezo element 16 of the actuating device 29, depending on the supplied operating frequency, expands and contracts a few thousand times per second, the required pressure within the anti-lock braking system can be generated within a millisecond range. In this manner a defined slip of the wheels can be realized for rpm control via the wheel sensors 31, 32 and this will result in an ideal anti-lock braking system. The piezo element 16 of the actuating device 29 is controlled by the control circuit 30 such that a very precise and especially quick control during braking is ensured.

Since the actuating device 29 in the form of a piezo pump can also be used as a control element, it is possible to arrange the anti-lock braking system directly on the main braking cylinder 33. The actuating device 29 only requires minimal mounting space and is very light-weight. Furthermore, the actuating device 29 can be produced very inexpensively. Due to the high actuating frequency that is realizable with the piezo element 16, an optimum control of the braking force is possible. Especially a very high actuating frequency for producing a constant friction at the wheels is possible so that a maximum braking action can be achieved.

It is, of course, also possible to provide for each wheel of a vehicle a separate actuating device 29 whereby these separate actuating devices 29 can be controlled individually. In this case, each of the brake lines is provided with one of the actuating devices 29.

Figure 5:
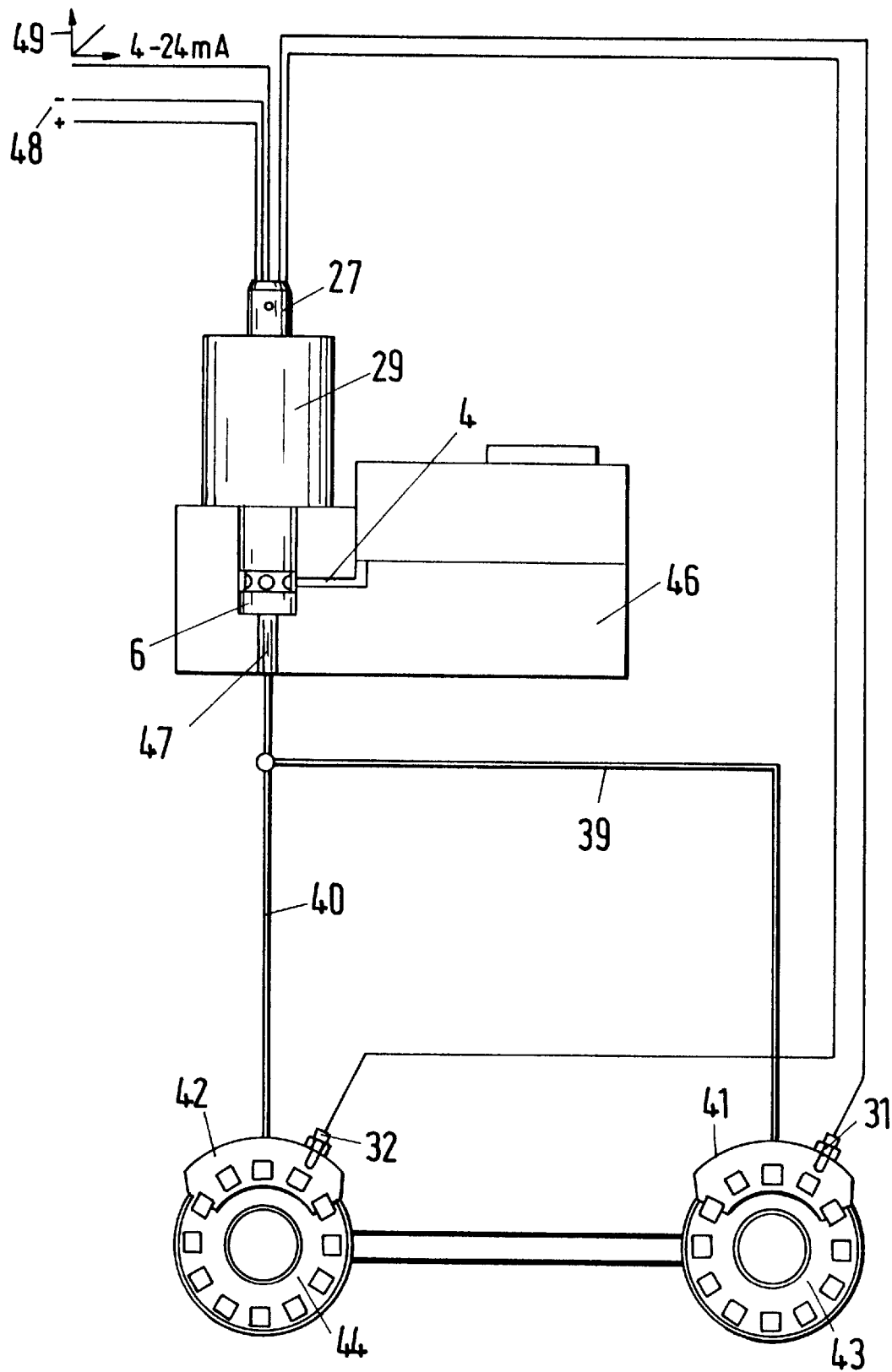
FIG. 5 shows another embodiment of the inventive actuating device integrated into an anti-lock braking system.

In the embodiment according to FIG. 5 the brake lines 39, 40 are connected to a line 47 which is connected to the recess 6 of the actuating device 29. The actuating device 29 is embodied corresponding to the embodiment of FIGS. 1 to 3. Via the inlet 4 of the actuating device 29 the brake fluid is pumped from a brake fluid container 46. The two wheel sensors 31, 32 are directly connected to the connector 27 of the actuating device 29. Via this connector 27 the actuating device 29 is also connected to the current supply 48 and to the brake potentiometer 49 which, in accordance with the embodiment of FIG. 4, is connected to a control circuit of the anti-lock braking system. When the brake pedal 45 (FIG. 4) is actuated, a corresponding signal is sent to the actuating device 29 via the brake potentiometer 49. The piezo element 16 is thus activated. As disclosed in connection with FIGS. 1 through 3, the piston slide 3 is reciprocated at a high frequency and thus pumps brake fluid via the inlet 4 and forces it via the line 47 into the brake lines 39, 40. The wheel sensors 31, 32 monitor the rotational velocity of the brake disks 43, 44 and thus of the wheels of the vehicle. As soon as the rotational velocity drops below a preset limit and there is a risk that the respective wheel will lock, the brake pressure is first, as disclosed in the embodiment according to FIG. 4, maintained at the present value. When the rotational velocity of the respective wheel increases again and surpasses a predetermined upper limit, the brake pressure within the lines 39, 40 is again increased so that the wheel is again decelerated. In this manner, the vehicle can be easily decelerated without the risk of locking the wheels. The actuating electronic member 17 of the actuating device 29 is designed such that it allows for anti-lock braking control. In connection with the piezo element 16 a simple but very precise control of the braking action of a vehicle is thus possible. As mentioned before in connection with the embodiment of FIG. 4, for each wheel to be braked an individual actuating device 29 may be provided. It is then only necessary to connect the wheel sensors 31, 32 to the connector 27 of the actuating device 29. The piezo element 16 is then controlled in the aforedescribed manner such that the pressure within the brake lines 39, 40 is either maintained constant, reduced, or increased. Due to the very short response times of the piezo element 16 the control action is very precise.

The actuating device 29 and the brake fluid container 46 can be arranged directly at the wheel braking cylinder of each wheel. Thus, the brake system can be activated simply by a single electric signal (brake by wire). This allows for a substantial reduction of the signal transmission time, and a stable, highly dynamic system can be provided. In this case, it is possible without problems to use the actuating device 29 as a braking system with anti-lock function for use in trailers. Thus, for the wheels of the trailer a central actuating device 29 can be provided. However, it is also possible to provide for each wheel an actuating device 29 at the wheel braking cylinder so that each wheel can be individually controlled.

Figure 6:
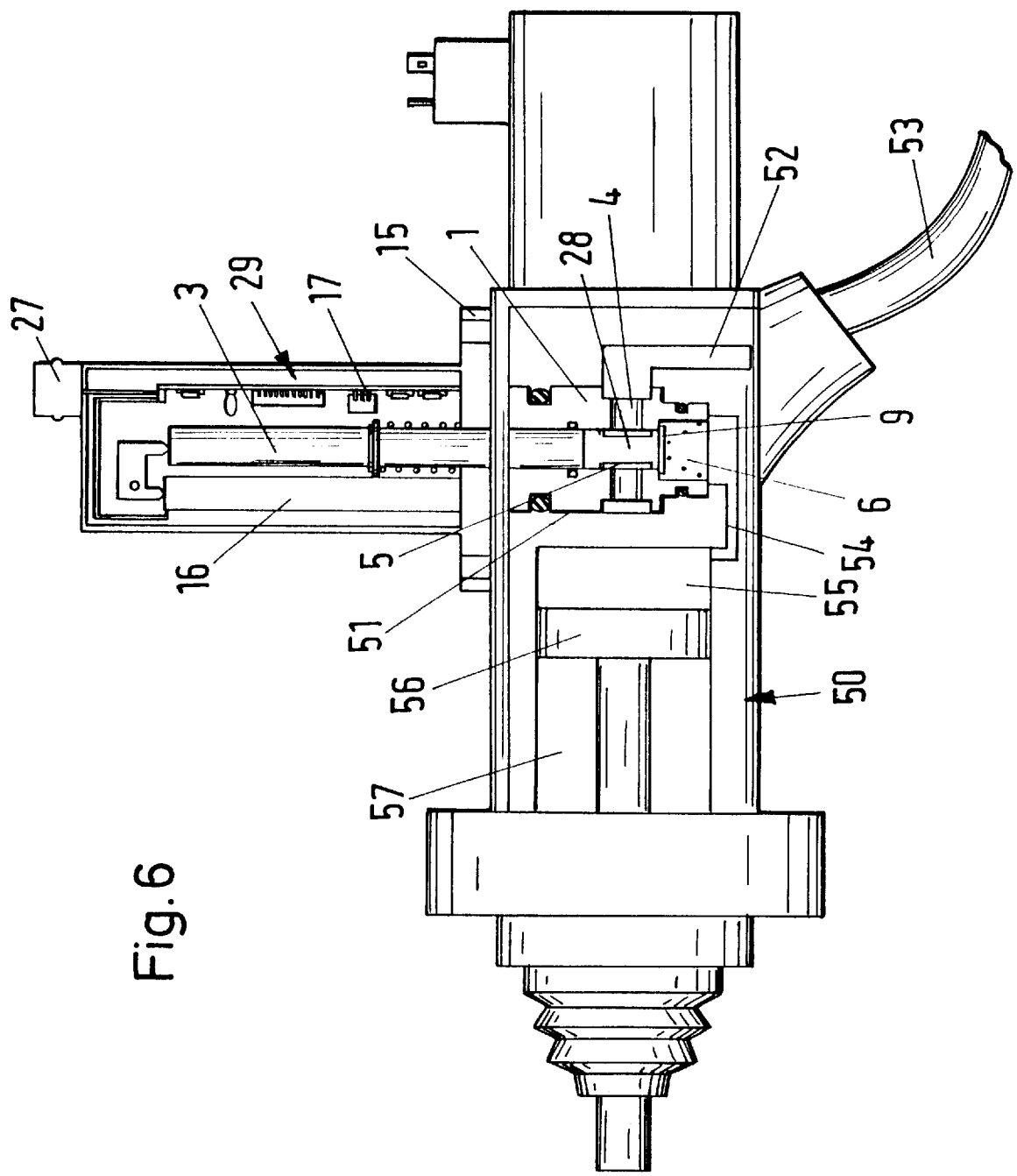
FIG. 6 shows the actuating device of the present invention as an emergency pump for a coupling control cylinder.

FIG. 6 shows a further scenario of the actuating device 29. In this case it functions as an auxiliary or emergency pump for a coupling control cylinder 50. The actuating device 29 is directly connected to the coupling control cylinder 50 with its flange 15. The housing 1 of the actuating device 29 extends into the mounting space 51 of the coupling control cylinder 50. To the inlet 4 of the actuating device 29 a line 52 is connected via which the hydraulic medium can be pumped in. The hydraulic medium is pumped out via the connecting line 53 of the coupling control cylinder 50 upon operation of the piezo element 16 in the manner disclosed in connection with FIGS. 1 through 3.

To the recess 6 of the actuating device 29 a line 54 is connected that is provided within the coupling control cylinder 50 and connects the recess 6 with the cylinder chamber 55. The cylinder chamber 55 is separated by the piston 56 from a further cylinder chamber 57.

When the piezo element 16 is actuated in the aforedescribed manner, the piston slide 3 of the actuating device 29 is reciprocated. When the piston slide 3, in the representation according to FIG. 6, is moved upwardly, the hydraulic medium is pumped via line 52 into the receiving chamber 28 so that the check valve 9 is opened. When subsequently the piston slide 3 is moved in the downward direction (FIG. 6), the hydraulic medium contained within the receiving chamber 28 is pressurized and the check valve 5 is closed. When surpassing a corresponding pressure, the check valve 9 is opened so that the hydraulic medium can reach, via the recess 6 and the line 54, the cylinder chamber 55. The hydraulic pressure displaces the piston 56. In this manner, the non-represented coupling device is actuated.

With the actuating device 29 in conjunction with an automatic transmission it is possible to provide for an emergency disengagement of the coupling cylinder when the motor is turned off, for example, via a door contact and to thus provide a decoupling (clutch separation). This ensures that the clutch is always separated before starting the motor. The door contact, which is connected to the electrical connector 27 of the actuating device 29 thus activates the piezo element 16. The piezo element 16 is able to perform more than 1,000 strokes per second so that very quickly the required volume, respectively, the required pressure can be generated for displacing the coupling element.

With the actuating device 29 it is also possible to perform a coupling actuation in an automatic transmission. The actuation electronic member 17 of the actuating device 29 can be embodied such that with it a control circuit can be designed that is to be closed with a distance measuring system. With such a control circuit a coupling actuation resulting in a smooth, controlled driving from a dead stop is possible. The actuating electronic member 17 is enclosed within the housing 1, 14 of the actuating device 29 so that the high voltage required for activating the piezo element 16 will not cause any problems. Since the control circuit is contained within the actuating electronic member 17, the actuating device 29 must only be supplied with the required current and the required control values. The actuating device 29 is of a simple construction. When using it for activating the coupling function of an automated manual transmission, no further switching elements are necessary, not even for predetermining a coupling position.

The actuating device 29, due to its disclosed pumping action, can be used everywhere where pumps are required. Possible applications of the actuating device 29 are thus power steering pumps, lubricant pumps etc. A further application of the actuation device 29 is its use as a fuel injection device for motor vehicles. The piezo element 16 can be activated with a frequency-dependent control such that a precise amount of fuel can be injected at a predetermined point in time. Since the piezo element 16 operates at high frequency, the actuating device 29 is especially suitable for an injection process. The fuel is pumped in via the inlet 4 upon displacement of the piston slide 3, and upon its return is forced out of the opened check valve 9. The diameter of the piston slide 3 in this case can be very small. With a corresponding embodiment of the transmission member 18, the relatively small stroke of the piezo element 16 can be enforced as needed in order to precisely adjust the pumped flow, respectively, the pressure increase of a pre-pressurized medium per stroke.

The present invention is, of course, in no way restricted to the specific disclosure of the specification and drawings, but also encompasses any modifications within the scope of the appended claims.

What I claim is:

1. An actuating device for a coupling of an automatic transmission of a vehicle, said actuating device comprising:
    a housing;
    at least one piston slide positioned in said housing for pumping a pressure medium to a coupling element;
    at least one piezo element positioned in said housing and acting on said at least one piston slide for displacing said piston slide from a neutral position in a reciprocating displacement direction within said housing.

2. An actuating device according to claim 1, further comprising a transmission member connected between said piezo element and said piston slide.

3. An actuating device according to claim 2, wherein said transmission member is a pivot lever.

4. An actuating device according to claim 2, wherein:
said transmission member comprises a first and a second arms extending parallel to one another;
said piezo element has an end face facing said transmission member;
said piston slide has an end face facing said transmission member;
said first arm resting at said end face of said piezo element and said second arm resting at said end face of said piston slide.

5. An actuating device according to claim 4, wherein said pivot lever has a stay connecting said first and second arms and wherein said pivot lever has a pivot axis located at said stay.

6. An actuating device according to claim 5, wherein said pivot axis extends at a right angle to said reciprocating displacement direction of said piston slide.

7. An actuating device according to claim 2, wherein said piezo element and said piston slide extend parallel to one another.

8. An actuating device according to claim 2, further comprising a biasing element acting on said piston slide so as to force said piston slide in a biasing direction toward said transmission member.

9. An actuating device according to claim 8, wherein said housing comprises at least one inlet for the pressure medium, wherein said piston slide pumps the pressure medium from said at least one inlet.

10. An actuating device according to claim 9, further comprising a first check valve for closing said at least one inlet.

11. An actuating device according to claim 10, wherein:
said housing has a receiving chamber into which said inlet opens;
said first check valve is a radially elastically deformable sleeve positioned in said receiving chamber;
said first check valve opens said inlet by suction, created by said piston slide when displaced by said piezo element from said neutral position in said biasing direction, in order to allow flow of the pressure medium from said inlet into said receiving chamber.

12. An actuating device according to claim 11, further comprising a second check valve, wherein said housing has a flow connection for connecting said receiving chamber to the coupling element and wherein said second check valve is positioned in said flow connection for closing said flow connection.

13. An actuating device according to claim 12, wherein said second check valve opens said flow connection with a pressure created by said piston slide when displaced by said piezo element from said neutral position in a direction toward said flow connection.

14. An actuating device according to claim 13, further comprising a control cylinder having a cylinder chamber, wherein the pressure medium flows through said second check valve into said cylinder chamber.

15. An actuating device according to claim 14, wherein said control cylinder comprises a control piston and wherein said control piston delimits said cylinder chamber and is connected to the coupling element.

16. An actuating device according to claim 14, wherein said piezo element and said piston slide are components of a ready-to-mount module.

17. An actuating device according to claim 16, wherein said ready-to-mount module is at least partially integrated into said control cylinder.

18. An actuating device according to claim 16, wherein said ready-to-mount module includes said housing.

19. An actuating device according to claim 1, further comprising an actuating electronic member positioned within said housing for activating said piezo element.

20. An actuating device according to claim 1, wherein said housing comprises an electrical connector.

21. An actuating device according to claim 1, wherein said housing comprises a mounting flange.

22. An actuating device according to claim 1, further comprising an actuating electronic member positioned within said housing for activating said piezo element, wherein said electronic member and said piezo element are positioned on opposite sides of said piston slide within said housing.

* * * * *